United States Patent [19]

Sala et al.

[11] Patent Number: 4,985,302

[45] Date of Patent: Jan. 15, 1991

[54] REMOVABLE SELF-ADHESIVE SHEET WITH WRITABLE SURFACE

[75] Inventors: Guido Sala, Milan; Ivano Zucchiatti, Arese, both of Italy

[73] Assignee: Incas International Carbon Solvent S.p.a., Italy

[21] Appl. No.: 202,960

[22] Filed: Jun. 3, 1988

[30] Foreign Application Priority Data

Feb. 8, 1988 [IT] Italy ................. 20608/88[U]

[51] Int. Cl.$^5$ .................. B32B 7/12; B32B 15/04
[52] U.S. Cl. .................. 428/343; 428/353; 428/340; 428/354; 428/355
[58] Field of Search ................. 428/352, 343

[56] References Cited

U.S. PATENT DOCUMENTS

| | | | |
|---|---|---|---|
| 3,543,920 | 12/1970 | Crocker et al. | 428/352 X |
| 3,916,063 | 10/1975 | Dratz et al. | 428/505 X |
| 4,070,523 | 1/1978 | Blum et al. | 428/354 X |
| 4,138,527 | 2/1979 | Malek | 428/354 X |
| 4,708,907 | 11/1987 | Flutti et al. | 428/352 |

*Primary Examiner*—George F. Lesmes
*Assistant Examiner*—D. R. Zirker
*Attorney, Agent, or Firm*—parkhurst, Wendel & Rossi

[57] ABSTRACT

A removable self-adhesive sheet with a writable surface, for application to written surfaces to and from which it can be repeatedly applied and removed a large number of times always maintaining good adhesion but without compromising the written surface.

16 Claims, No Drawings

REMOVABLE SELF-ADHESIVE SHEET WITH WRITABLE SURFACE

This invention relates to a removable self-adhesive sheet with a writable surface, for application to written surfaces of paper or other material, to and from which it can be repeatedly applied and removed a large number of times always maintaining good adhesion but without compromising the written surface.

The sheet according to the invention is produced in vivaceous colours and is of particular use in carrying annotations, additions, corrections etc. to be made to a written surface, and is also particularly useful for applying messages to documents, reports etc.

If to be used for carrying annotations, additions, corrections etc., said sheet is transparent. It is applied to the written surface which is to be altered, and the annotations etc. are written on the surface of the sheet at the point where the alteration is required, such as between one line of writing and another, or in the margin etc.

The sheet is of a size suitable for the amount of alteration to be made to the writing, and thus can be in the form of tape if used to correct lines, or be larger if used to correct for example a drawing.

The described application has numerous advantageous aspects. In particular, when the required alterations have been made, the self-adhesive sheet can be removed without compromising the underlying writing, thus preserving the original document intact.

A further advantageous aspect is that the vivaceous colouring of the sheet immediately highlights the annotations, additions, corrections etc. to be made.

These advantages are even more apparent if the application of the present invention is compared with currently used methods for making corrections, additions etc.

In this respect, these are currently done by writing either directly on the written surface or on a separate sheet. In the first case the document is subsequently unusable, whereas in the second case the whole operation becomes tedious.

When correcting drawings, the erasing or scraping currently done means that the original version is lost, whereas with the sheet according to the invention the original version remains intact.

The sheet according to the invention can therefore be used advantageously in a great number of applications in the office, in school or in the home, where it can be applied to the pages of exercise books, books in general, registers, newspapers, magazines, drawings, circulars and the like.

The sheet according to the present invention is also of advantageous use for messages to be applied to documents, and in this case the sheet is opaque, is of suitable size and is covered with adhesive only along one side.

In various working practices it is normal to leave messages for example regarding work to be done, the interpretation of circularized information sheets, operating procedures, expiry dates etc.

Compared with the self-adhesive sheets currently used for this purpose, the sheet according to the invention has the advantage of colourations which immediately draw the attention.

The removable self-adhesive sheet with writable surface according to the present invention comprises a support consisting of a coloured or non-coloured, transparent or opaque polymer film, and is characterised in that said support has one face totally or partly covered with adhesive of low adhesiveness and its other face able to be written on.

These and further characteristics and advantages of the sheet according to the present invention will be more apparent from the description of preferred embodiments of the invention given hereinafter by way of non-limiting example only.

The film forming the support consists of transparent or opaque polymer material such as polyvinylchloride, polypropylene, cellulose acetate, polyester, cellophane, high-density polyethylene or polyolefin coextrusions.

On one face of said support there is applied an adhesive which is of low adhesiveness so that when applied to a written sheet of paper it can be removed without altering either the sheet or the writing. In addition, said adhesive allows application and removal a large number of times.

Preferably, the adhesive removability characteristics of the sheet when evaluated by a dynamometer for removal from cigarette paper of RIZLA type range in value from 30 to 70 g/linear cm.

These characteristics are obtained by using for example an adhesive having the following chemical composition:

| | |
|---|---|
| natural rubber | 65–75% by weight |
| hydrocarbon resins | 25–35% by weight |
| polyisobutylene | 0–10% by weight |
| polybutenes | 0–10% by weight |

Alternatively, removable adhesive mixtures of synthetic derivation can be used, such as water-dispersion acrylic resins, self-crosslinking solution acrylic resins, synthetic rubbers and their dispersions, self-adhesive polyurethane mixtures and the like.

A vulcanization additive is added if necessary to the adhesive mixture during its spreading.

If necessary, the adhesive layer is anchored to the film by a colourless or coloured anchoring layer or by suitable surface treatment such as corona or flame treatment.

Preferably, said adhesive is applied to the film in a quantity of 12–15 g/m² of surface area.

The other face of the support is treated, so that it can be written upon. For example, on the other side of the support film an ink is applied which is of fluorescent or non-fluorescent, transparent or opaque type.

This ink has for example the following chemical composition:

| | |
|---|---|
| pigment | 30–37% by weight |
| vinyl or acrylic resin | 9–15% by weight |
| synthetic wax | 0.3–1.0% by weight |
| epoxide stabiliser | 0.4% by weight |
| Phthalic acid esters | 4–5% by weight |
| ethyl acetate | 38–55% by weight |
| ethanol | 9–11% by weight |

An ink with a lower dry substance content such as 30% by weight can also be used, it being applied by a rotogravure printing or spreading system.

Preferably, the ink is applied to the film in a quantity of 1–10 g/m² of surface area.

It has a high resistance to the adhesive with which it comes into contact if the material is packaged in rolls, and it is also possible to write on this ink layer with both pencil and pen.

As an alternative to using ink on one face of the film, a film can be used which has been coloured throughout and has one face treated to allow it to be written on by pencil and pen. Suitable treatments for this purpose include for example embossing, corona treatment, flame treatment and chemical surface oxidation treatment.

In a further embodiment the sheet according to the invention can be formed from a film having one surface treated to make it suitable for writing and with the coloured ink on the other surface as an intermediate layer between the film and adhesive.

If to be used for annotations, corrections etc., the sheet can be produced in the form of transparent continuous sheet packaged into rolls of any width and with the adhesive completely covering one surface.

Alternatively it can be produced in sizes suitable for writing a message, and in this case is opaque and has the adhesive applied only along one edge.

The sheet according to the invention can be produced in various fluorescent or non-fluorescent colours using various pigments, such as yellow, orange, green, lilac, blue etc.

We claim:

1. A removable self-adhesive sheet with a writable surface comprising a support consisting of a polymer film, wherein the support has a first face at least partially covered with an adhesive having a low adhesiveness value, a second face, and an ink applied on said second face, said ink having the following chemical composition:

| pigment | 30 to 37% by weight, |
|---|---|
| vinyl or acrylic resin | 9 to 15% by weight, |
| synthetic wax | 0.3 to 1% by weight, |
| epoxide stabilizer | 0.4% by weight, |
| phthalic acid esters | 4 to 5% by weight, |
| ethyl acetate | 38 to 55% by weight, and |
| ethanol | 9 to 11% by weight. |

2. A sheet according to claim 1, wherein the polymer film is selected from the group consisting of poly-vinylchloride, poly-propylene, cellulose acetate, polyester, cellophane, high-density poly-ethylene or polyolefin coextrusion.

3. A sheet according to claim 1, wherein the adhesive has the low adhesiveness value of from 30 to 70 gram/linear centimeter when evaluated by a dynamometer for removal from type Rizla cigarette paper.

4. A sheet according to claim 1, wherein the adhesive has the following chemical composition:

| natural rubber | 65–75% by weight, |
|---|---|
| hydrocarbon resins | 25–35% by weight, |
| polyisobutylene | 0–10% by weight, and |
| polybutenes | 0–10% by weight. |

5. A sheet according to claim 1, wherein the adhesive consists of a removable synthetic adhesive mixture selected from the group consisting of water-dispersion acrylic resins, self-crosslinking solution acrylic resins, synthetic rubbers and their dispersions, and self-adhesive polyurethane mixtures.

6. A sheet according to claim 1, wherein the adhesive is anchored to the polymer film by a anchoring layer.

7. A sheet according to claim 1, wherein the adhesive is anchored to the polymer film by surface treatment.

8. A sheet according to claim 1, wherein the adhesive is applied to the polymer film in a quantity of 12–15 g/m² of surface area.

9. A sheet according to claim 1, wherein the ink is applied in a quantity of between 1 and 10 g/m² of surface area.

10. A sheet according to claim 1, wherein a layer of coloured ink is applied as an intermediate layer between said film and said adhesive.

11. A sheet according to claim 1, which is in the form of a continuous sheet packaged into rolls of any width.

12. A sheet according to claim 1, which is of a size suitable for writing a message.

13. A sheet according to claim 1, which is colored.

14. A removable self-adhesive sheet with a writable surface comprising a support consisting of a film of a polymer selected from the group consisting of polyvinylchloride, poly-propylene, cellulose acetate, polyester, cellophane, high-density poly-ethylene, wherein the support has one face at least partially covered with an amount of from 12 to 15 gram/square meter of an adhesive having an adhesiveness value of from 30 to 70 gram/linear centimeter when evaluated by a dynamometer for removal from cigarette paper, type Rizla, and a second face treated so as to be capable of being written upon by applying on it a an amount of from 1 to 10 gram/square meter of surface of an ink having the following chemical composition: pigment (30 to 37% by weight), vinyl or acrylic resin (9 to 15% by weight), synthetic wax (0.3 to 1% by weight), epoxide stabilizer (0.4% by weight), phthalic acid esters (4 to 5% by weight), ethyl acetate (38 to 55% by weight), and ethanol (9 to 11% by weight).

15. A sheet according to claim 14, wherein the adhesive has the following chemical composition:

| natural rubber | 65–75% by weight, |
|---|---|
| hydrocarbon resins | 25–35% by weight, |
| polyisobutylene | 0–10% by weight, and |
| polybutenes | 0–10% by weight. |

16. A sheet according to claim 14, wherein the adhesive consists of a removable synthetic adhesive mixture selected from the group consisting of water-dispersion acrylic resins, self-crosslinking solution acrylic resins, synthetic rubbers, synthetic rubber dispersions, and self-adhesive polyurethane mixtures.

* * * * *